Sept. 18, 1945. J. H. COLEMAN 2,384,814
PRODUCTION OF PURE PHOSPHORIC ACID AND INTERMEDIATE PRODUCTS
Filed April 8, 1942
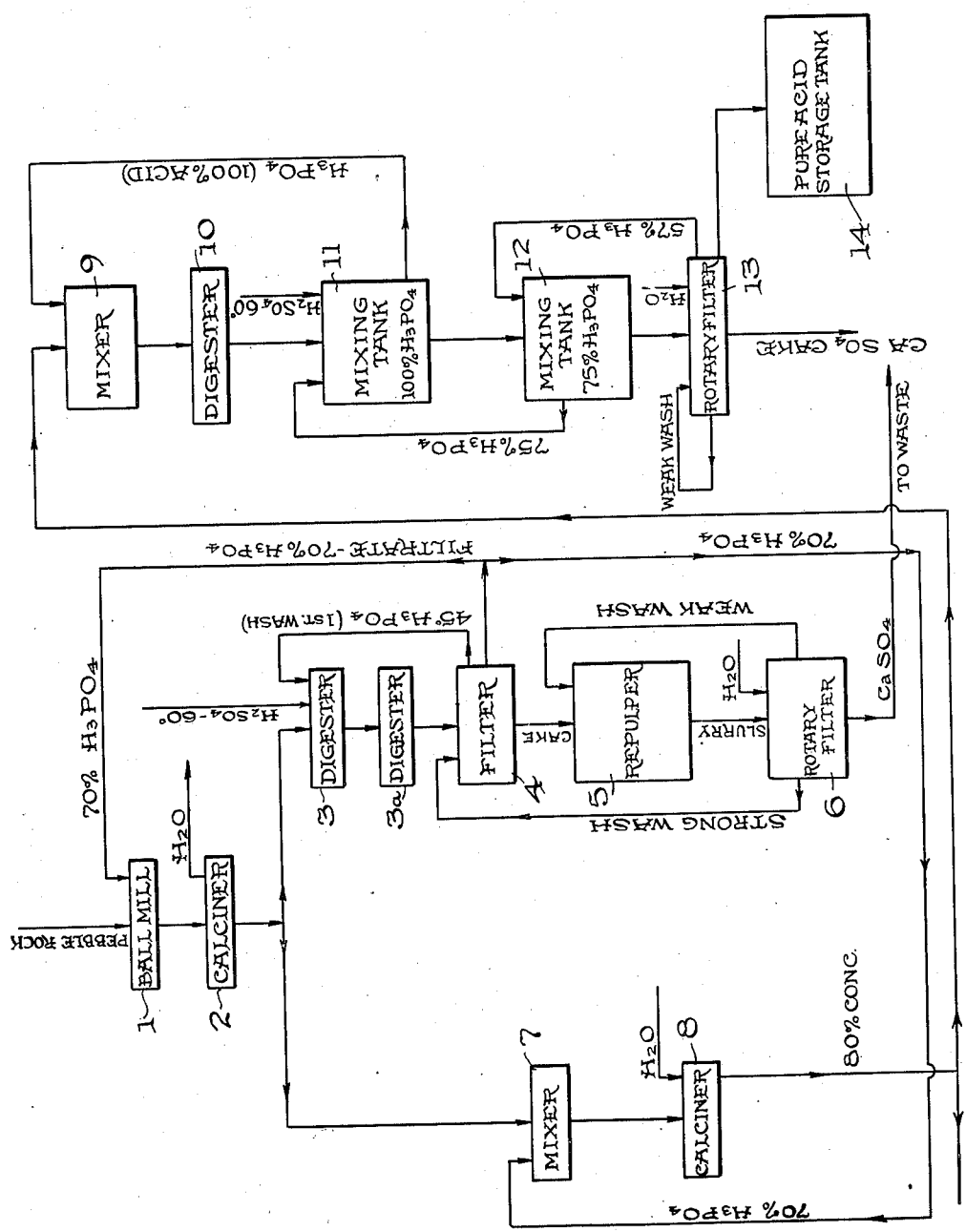
INVENTOR.
JOHN H. COLEMAN
BY
ATTORNEYS Patented Sept. 18, 1945

2,384,814

UNITED STATES PATENT OFFICE 2,384,814

PRODUCTION OF PURE PHOSPHORIC ACID AND INTERMEDIATE PRODUCTS

John Harry Coleman, Plainfield, N. J., assignor to Southern Phosphate Corporation, New York, N. Y., a corporation of Delaware Application April 8, 1942, Serial No. 438,174

13 Claims. (Cl. 23—109)

The present invention relates to a process for the production of phosphoric acid of high purity and intermediate products, particularly crude phosphoric acid, which, if desired, may be utilized as such.

More particularly the present invention relates to a process in which crude phosphoric acid is produced from substantially dehydrated phosphate complexes or polyphosphates having a CaO to $P_2O_5$ ratio greater than 1:1 and less than 2:1 by treatment with a mixture of sulfuric and phosphoric acids, which crude phosphoric acid may be used as such or mixed with a phosphate and calcined to produce an acid calcium metaphosphate containing CaO and $P_2O_5$ in a ratio less than 1:1 but not less than 1:2 which may be shipped as a concentrated source of $P_2O_5$ or mixed with phosphoric acid and the resultant mixture heated to render the acid calcium metaphosphate soluble, after which it is digested with a mixture of sulfuric and phosphoric acids to form phosphoric acid of high purity.

The substantially dehydrated phosphate complexes or polyphosphates which are used for producing the crude phosphoric acid may be obtained from any source but where natural phosphate rock is available the process preferably uses such raw rock as the starting material and treats it with an amount of phosphoric acid to give a resultant mixture having the desired CaO to $P_2O_5$ ratio. Such mixture is then dehydrated or calcined to form the substantially dehydrated phosphate complex or polyphosphate.

While my investigations have indicated that one or more of the phosphate complexes or polyphosphates having a CaO to $P_2O_5$ ratio greater than 1:1 and less than 2:1 are definite compounds, the term "polyphosphate" will be used herein to designate either a definite compound or a phosphate complex having such a CaO to $P_2O_5$ ratio.

The process of the present invention is an improvement over the usual wet process for the production of phosphoric acid from natural phosphate rock with the aid of sulfuric acid, wherein the phosphate rock, ground to a suitable fineness, is digested slowly in fairly dilute sulfuric acid with the formation of calcium sulfate in finely divided condition. The time of digestion with the sulfuric acid varies from five to twelve hours, and the usual concentration of the resultant phosphoric acid is from 40% to 50%. The calcium sulfate which is formed in such a process entrains large quantities of phosphoric acid, the recovery of which entails voluminous washings with water with consequent dilution of the phosphoric acid to an extent such that subsequent concentration by evaporation is necessary to produce phosphoric acid suitable for most purposes, and which may be transported economically.

Because of its corrosive nature, concentration of phosphoric acid by evaporation is a difficult and expensive operation, and efforts to increase the concentration other than by evaporation of the acid resulting from the initial digestion with sulfuric acid have resulted in incomplete decomposition of the phosphate rock and the production of a more finely divided calcium sulfate which is more difficult to settle and filter. For those reasons, and for the further reason that the handling of large volumes of weak phosphoric acid involves large units of expensive equipment and high operating costs, the wet processes of producing phosphoric acid heretofore proposed have not been entirely satisfactory.

The primary purpose of the present invention is to provide an improved method of producing purified phosphoric acid and valuable intermediate products, particularly crude phosphoric acid which is free from the objections to the wet process, as outlined above, and in which purified phosphoric acid of high concentration and intermediate products may be produced at a relatively low cost.

Accordingly, the present invention contemplates the mixing of phosphatic material and phosphoric acid in such relative amounts that the resulting mixture of polyphosphates has a CaO to $P_2O_5$ ratio greater than 1:1 and less than 2:1, heating the resulting mixture to cause the reaction between the phosphoric acid and the phosphatic material to go to completion and to substantially dehydrate the resulting polyphosphate and to remove objectionable halogens, and thereafter treating the substantially dehydrated and substantially halogen-free polyphosphate with a mixture of sulfuric acid and phosphoric acid to form orthophosphoric and pyrophosphoric acids and calcium sulfate. The pyrophosphoric acid which is formed readily hydrates to form orthophosphoric acid.

Monocalcium phosphate has the formula $CaH_4(PO_4)_2$ and corresponds to a CaO to $P_2O_5$ ratio of 1:1. Dicalcium phosphate has the formula $CaHPO_4$ and corresponds to a CaO to $P_2O_5$ ratio of 2:1. Between those two compounds an infinite number of polyphosphates can be formed, all of which, so far as investigated, are better adapted for the production of phosphoric acid according to the present invention than either the monocalcium phosphate or the dicalcium phosphate.

The polyphosphates between the monocalcium phosphate and the dicalcium phosphate which I have investigated are:

| Polyphosphate | CaO to $P_2O_5$ ratio |
|---|---|
| $Ca_{10}P_{18}O_{55}$ | 10:9 |
| $Ca_5P_8O_{25}$ (octo phosphate) | 5:4 |
| $Ca_9P_{14}O_{44}$ | 9:7 |
| $Ca_4P_6O_{19}$ | 4:3 |
| $Ca_7P_{10}O_{32}$ | 7:5 |
| $Ca_3P_4O_{13}$ (tetra phosphate) | 3:2 |
| $Ca_8P_{10}O_{33}$ | 8:5 |
| $Ca_5P_6O_{20}$ (tri phosphate) | 5:3 |

When natural phosphate rock is used as the starting material for the production of the polyphosphates from which the crude phosphoric acid is produced, it is ground to a suitable fineness and then admixed with phosphoric acid in such amount that the CaO to $P_2O_5$ ratio in the resultant mixture is greater than 1:1 and less than 2:1, that is, is greater than the CaO to $P_2O_5$ ratio in monocalcium phosphate, but less than the CaO to $P_2O_5$ ratio in dicalcium phosphate. The use of such an amount of phosphoric acid for treating the phosphate rock also results in the initial reaction between the phosphate rock and acid being more complete and rapid than when other amounts of phosphoric acid are used.

The use of phosphoric acid in the treatment of the natural phosphate rock has been found to be preferable to the use of sulfuric acid, as it reacts more readily than the sulfuric acid, due to the fact that sulfuric acid initially reacts with the phosphate rock and forms thereon a coating of calcium sulfate which acts as a barrier, and impedes further reaction between the sulfuric acid and the phosphate rock. When phosphoric acid is used, the calcium phosphate which is formed dissolves in the phosphoric acid and does not remain as an insoluble coating on the phosphate rock to impede further reaction. Furthermore, in the present process it is desirable to prevent the formation of calcium sulfate until all the phosphate rock has been decomposed.

The exact concentration of the phosphoric acid used for decomposing the phosphate rock is not critical. It should be sufficiently concentrated to give a relatively dry resultant product, but not so concentrated that enough liquid will not be present to thoroughly wet the phosphate rock. If the phosphoric acid should be too concentrated it would be necessary, in order to sufficiently wet the phosphate rock, to use an amount of acid so great that the CaO to $P_2O_5$ ratio of the resulting mixture would be less than that specified above. Ordinarily, phosphoric acid of 65% to 75% concentration is preferred.

The temperature of the phosphoric acid with which the phosphate rock is treated, likewise, is not critical. It may be cold, but preferably should be sufficiently warm or hot that the reaction between the phosphoric acid and the phosphate rock goes fast enough that complete mixing is obtained before the mass sets. Temperatures of reaction between 50° C. and 100° C. are preferred.

The reaction between the phosphoric acid and the phosphate rock takes place rapidly and ordinarily is sufficiently complete in from 1 to 5 minutes. It is not necessary that the reaction be permitted to go to completion, and it is sufficient if the phosphoric acid is sufficiently distributed through the phosphate rock and a solidified mixture of the rock and acid is obtained, as such further reaction between the rock and acid which may be necessary to completely decompose the rock may take place in a subsequent calcining or dehydrating operation.

The relatively dry mixture resulting from the treatment of the phosphate rock with the phosphoric acid, which may consist of calcium polyphosphate, calcium orthophosphate and unreacted phosphate rock and phosphoric acid, is heated or calcined until any remaining phosphate rock and phosphoric acid have reacted and until most of the moisture present is removed. Neither complete dehydration nor the removal of any molecular water which may be present is necessary. However, the dehydration should be sufficient to remove at least 75% to 90% of the moisture present, and to liberate most (95% to 98%) of the fluorine or other objectionable halogens found in the combined state in the phosphate rock and to cause them to be carried off in gaseous form. The calcination or dehydration advantageously may be carried out at temperatures ranging between 175° C. and 240° C., although higher or lower temperatures may be used. However, the use of higher temperatures renders the process more expensive without any compensating benefits, and the use of too high a temperature would result in the formation of pyrophosphates which it has been found should be avoided if the maximum advantages of the process are to be obtained. Entirely satisfactory results have been obtained by calcining or dehydrating at temperatures around, or just under 200° C., and the use of such a temperature appears to be most advantageous, considering the results obtained and the cost of heating.

The product remaining after the calcining or dehydrating operation is a substantially dry polyphosphate, substantially free from fluorine or other objectionable halogens and having a CaO to $P_2O_5$ ratio greater than 1:1 and less than 2:1. Such polyphosphates are digested readily with a mixture of sulfuric and phosphoric acids to form phosphoric acid and calcium sulfate. Also, the calcium sulfate which is formed as a result of such digestion does not readily hydrate and is more readily filtered from the phosphoric acid which is formed. Consequently, it requires a minimum of water for washing out entrained phosphoric acid.

A further advantage obtained by the use of such relatively dry polyphosphates for digestion with sulfuric and phosphoric acids is the production of orthophosphoric acid of high concentration. When using such relatively dry polyphosphates I am able, consistently, to produce orthophosphoric acid of a concentration of 70% to 75%, which usually is the upper limit of successful operation, due to difficulties encountered in connection with the filtering of orthophosphoric acid of higher concentrations.

The relatively dry polyphosphate remaining after the calcining or dehydrating operation may be used, as such, as a fertilizer, or as a material for forming other phosphates to be used as fertilizers. When the substantially dry polyphosphate is to be used for the production of crude phosphoric acid it is digested with a mixture of sulfuric and phosphoric acids with resultant production of orthophosphoric acid of high concentration and pyrophosphoric acid, and the readily filterable calcium sulfate, previously referred to. The pyrophosphoric acid readily hydrates with excess water present to form more orthophosphoric acid. The calcium sulfate is filtered from the orthophosphoric acid and washed to remove entrained acid.

A mixture of sulfuric and phosphoric acids is used for the digestion of the polyphosphate as sulfuric acid, if used alone, would react with the polyphosphate with the resultant formation of an insoluble coating of calcium sulfate on the polyphosphate particles which would impede further reaction. When a mixture of sulfuric and phosphoric acids is used, the phosphoric acid first reacts with the calcium polyphosphate to form a calcium phosphate in solution in phosphoric acid which then reacts with the sulfuric acid to form the insoluble calcium sulfate. Furthermore, the washing of the filtered calcium sulfate to recover entrained phosphoric acid gives a solution of phosphoric acid which may be used in a subsequent operation for reaction with the polyphosphate.

The polyphosphates and the mixture of sulfuric and phosphoric acids are permitted to digest until all the calcium has reacted with the sulfuric acid, which will take place in from one to two hours or longer.

The amount of sulfuric acid in the digestion mixture of acids should be sufficient to precipitate all calcium present as calcium sulfate, and the amount of phosphoric acid should be sufficient to maintain a fluid mixture of the desired strength. The amount of phosphoric acid ordinarily necessary will be approximately one and one-half times the amount of $P_2O_5$ in the polyphosphate.

The strength of the sulfuric and phosphoric acids used for digesting the polyphosphate will depend on the extent to which the calcination or dehydration of the mixture of phosphate rock and phosphoric acid was carried out and the desired concentration of the crude orthophosphoric acid which is to be obtained. I have found that a mixture of 77% sulfuric and 60% phosphoric acid, when digested with the relatively dry polyphosphate resulting from the calcining operation will result in the recovery of phosphoric acid consistently running 70% or over in concentration, and the formation of calcium sulfate in a readily filterable form.

An essential feature of the present invention as far as the production of the crude phosphoric acid is concerned, is the digestion of a mixture of sulfuric and phosphoric acids with a relatively dry polyphosphate in which the CaO to $P_2O_5$ ratio is greater than 1:1 and less than 2:1. The use of a phosphate having a CaO to $P_2O_5$ ratio of 1:1 (monocalcium phosphate) may result in the formation of metaphosphate which, like dicalcium phosphate (CaO to $P_2O_5$ ratio of 2:1) is less effective for use in the present process, and gives less efficient recoveries of the crude acid. While all phosphates which I have investigated which have CaO to $P_2O_5$ ratios greater than 1:1 and less than 2:1 have been found to give more efficient recoveries of the crude phosphoric acid, the polyphosphates having a CaO to $P_2O_5$ ratio of 5:3 and 5:4 are preferred and the maximum efficiencies were obtained when using those polyphosphates. Also, those polyphosphates appeared to react more readily with the mixture of sulfuric and phosphoric acids. The use of polyphosphates having those CaO to $P_2O_5$ ratios also decreases the fuel consumption as there is less water to be driven off during the calcining or dehydrating operation; results in a less circulating load, in a decrease in the time required to filter the calcium sulfate from the final phosphoric acid, in a smaller quantity of water necessary to wash the filtered calcium sulfate and consequently a wash water sufficiently concentrated in phosphoric acid that it may be used without evaporation in a subsequent digestion of the substantially dehydrated polyphosphates; and lowers the $P_2O_5$ lost by poor digestion or poor washing.

When the crude phosphoric acid is to be further treated for the production either of acid calcium metaphosphate or purified phosphoric acid it, or such part thereof as is not returned for admixing with natural phosphate rock to form additional amounts of polyphosphate, or is not used in the digestion of the substantially dehydrated polyphosphate to form the crude acid, is mixed with another portion of the polyphosphates, or with phosphate rock, and the resulting mixture calcined to produce a substantially dehydrated acid calcium metaphosphate which may be shipped as a source of $P_2O_5$ for the production of pure phosphoric acid, or for use, as such, as a fertilizer, or for use in the production of phosphatic fertilizers, or the acid calcium metaphosphate may be further treated at its place of production.

The acid calcium metaphosphate as produced above approaches elemental phosphorus as a concentrated form of shippable phosphorus, and has the advantage over elemental phosphorus in that it may be handled and shipped as bulk material, the same as ordinary phosphate rock, and without the exercise of special precautions.

When the crude phosphoric acid is to be treated at its place of production to produce acid calcium metaphosphate or phosphoric acid of high purity, the portion thereof which is not returned for reuse for treating phosphate rock to form a polyphosphate having a CaO to $P_2O_5$ ratio greater than 1:1 and less than 2:1, or which is not used along with sulfuric acid for digesting the resultant relatively dry polyphosphate to form the crude phosphoric acid, is mixed with another portion of the relatively dry polyphosphate, or with natural phosphate rock, or other phosphates in such amount that the resultant product will be the particular metaphosphate which is desired. However, the amount of crude phosphoric acid mixed with the polyphosphate or other phosphatic material, should be such that the resulting metaphosphate will contain CaO and $P_2O_5$ in a ratio less than 1:1 but not less than 1:2. If the CaO to $P_2O_5$ ratio is less than 1:2 a material is formed which will not set up because of the presence of a liquid which is phosphoric acid, or a solution of a calcium phosphate in phosphoric acid, which when dehydrated gives metaphosphoric acid which, on exposure to air, adsorbs water and causes the concentrate to be sticky or mushy, so that it cannot conveniently be shipped in bulk. Also, if the CaO to $P_2O_5$ ratio is less than 1:2 a material is formed which is of a physical nature such that it cannot economically be dehydrated.

The phosphoric acid should be mixed violently with the polyphosphate or other phosphatic material, in order to get as intimate a mixture as possible before the mixture sets up.

A temperature of 120° C. is desired during the mixing of the crude phosphoric acid with the polyphosphate, or other phosphatic material, in order to eliminate as much water as possible during the mixing, and to facilitate the speed of the setting up of the material. Also such a temperature may aid the chemical reaction which results in the production of the acid calcium metaphosphate. The desired temperature of the mixture of crude phosphoric acid and polyphosphate may be obtained either by heating the crude phosphoric acid, or the polyphosphate or other phosphatic material prior to being admixed with the crude phosphoric acid, or the mixing may be carried out in a mixer having means to maintain the desired temperature. While a temperature of 120° C. is preferred during the mixing of the crude phosphoric acid and the polyphosphate, for the reasons just stated, such a temperature is not critical and higher or lower temperatures may be used. However, a temperature high enough to bring about a setting up of the phosphoric acid and the polyphosphate before they have been thoroughly mixed should not be used. Ordinarily the temperature used is such that the speed of setting up of the material is balanced against the violence of agitation.

After the polyphosphate or other phosphatic material has been thoroughly mixed with the crude phosphoric acid and the mixture has set up, it is calcined to eliminate water and to give a relatively concentrated acid calcium metaphosphate having a CaO to $P_2O_5$ ratio of less than 1:1 but not less than 1:2. The calcining also results in a burning off of organic material present, or else so charring it that it subsequently may be filtered off with calcium sulfate and other materials precipitated during the process.

A temperature of 350° to 400° C. during the calcination is preferred, and temperatures materially above 400° C. should not be used because above that temperature the acid calcium metaphosphate becomes progressively less soluble until a temperature of approximately 800° C. is reached, when the resulting material is substantially insoluble. Temperatures lower than 350° C. may be used during the calcination to produce substantially dehydrated, shippable products of high $P_2O_5$ value, although longer exposure of the material is necessary when lower temperatures are used. For example, a substantially dehydrated, shippable product may be obtained at about 100° C. with a long period of exposure, and substantially dehydrated, shippable products may be obtained at temperatures between 100° C. and 300° C. with progressively shorter periods of exposure. However, where it is desired to form acid calcium metaphosphates, the temperature during the calcination should be at least as high as 315° C. Temperatures of 350° to 400° C. are preferred because they are the most practical, considering the heat input and the time necessary to bring about the elimination of water and the formation of the acid calcium metaphosphate.

If the material is heated during the calcining operation to a temperature of about 275° C., a product will be obtained which contains iron and aluminum phosphates as impurities, and will be useful only for making crude phosphoric acid without further treatment to eliminate the iron and aluminum impurities, as at that temperature iron and aluminum compounds present as impurities will be converted into iron and aluminum pyrophosphates which, at a later step in the process, will dissolve in the phosphoric acid which is produced. When the temperature is carried to 315° C. or higher, iron and aluminum compounds which are present as impurities will be converted into iron and aluminum metaphosphates and as the iron and aluminum metaphosphates are insoluble in phosphoric acid they may subsequently be separated to leave phosphoric acid of high purity.

During the calcining operation the material is gradually brought up to the desired temperature of 350° C. to 400° C. The heating of the material below 150° C. should be slow enough that there is no melting of the material in the liberated liquid, because once melting occurs and a liquid is formed, whether water of crystallization, or phosphoric acid, or any liquid phosphatic compound, the resulting material, although capable of being dehydrated, will, after dehydration, be deliquescent and on cooling will adsorb water and give a resulting concentrate which is sticky and difficult to handle.

The heating of the material below 150° C. should be sufficiently slow that the water of crystallization passes off without forming as a liquid in the material in which the material from which it was driven would dissolve. After a temperature of 150° C. has been reached the heating may progress faster, but even above that temperature the heating should not be fast enough to liberate water from the material faster than it can pass from the mass being calcined or dehydrated. In other words, the same precautions must be taken above 150° C. which are taken below 150° C., although the heating at the higher temperature may progress more rapidly.

The material remaining after the calcination will be a highly concentrated acid calcium metaphosphate which may be shipped as a concentrated source of $P_2O_5$ or further treated to produce phosphoric acid of high purity.

When the acid calcium metaphosphate produced as described above, is to be further treated to produce phosphoric acid of high purity, it is mixed with an amount of phosphoric acid such that the acid which is formed in the resulting mass, theoretically, will be metaphosphoric acid. 100% phosphoric acid is used to avoid the formation of phosphoric acids other than metaphosphoric acid in which the iron and aluminum phosphates are insoluble and to avoid the introduction of additional water which subsequently would have to be evaporated. The metaphosphate and phosphoric acid are thoroughly mixed to give a pasty mass of such consistency that it will flow. The temperature at which the mixing takes place is not critical and the material may be cold or heated during the mixing.

The mixture of acid metaphosphate and phosphoric acid is then heated and digested at a temperature of 100° C. to 300° C. Higher temperatures may be used during the heating and digestion although the use of temperatures above 300° C. have been found to give no advantage and are more expensive. A temperature of about 150° C. is preferred. The heating and digestion is continued until the reaction between the acid calcium metaphosphate and the phosphoric acid, which started when they were initially mixed, is completed and the metaphosphate has been converted into metaphosphoric acid.

After the reaction between the acid calcium metaphosphate and phosphoric acid has been completed, the resulting material is subjected to a series of digestions and hydrations. During the first digestion, pure sulfuric acid is added to precipitate calcium present as calcium sulfate. Sulfuric acid of 60° to 66° Bé. is preferred, although sulfuric acid of any degree Bé. may be used because if water is added at this stage of the process less will have to be added subsequently when the 100% phosphoric acid which is formed is diluted to permit better filtering. During the initial digestion enough pure phosphoric acid may be added, along with the pure sulfuric acid, to bring the metaphosphoric acid down to orthophosphoric acid. Phosphoric acid of any strength below 100% may be used, or water may be used instead. However, the use of 57% orthophosphoric acid is preferred because it is obtainable from a later stage of the process. If some water is added with the sulfuric acid, less will have to be added as such, or in the phosphoric acid to bring the metaphosphoric acid down to orthophosphoric acid.

Substantially all iron and aluminum metaphosphates which are present as impurities are insoluble in the orthophosphoric acid and precipitate out with the calcium sulfate which is precipitated by the sulfuric acid.

The temperature during the first digestion is not critical and any temperature may be used, but a temperature in the neighborhood of 65° C. is preferred.

The product resulting from the first digestion will be substantially 100% phosphoric acid. A portion of it may be taken out without filtering and returned for mixing with the acid metaphosphate to form the mixture which is to be heated. The balance of the phosphoric acid, together with all precipitated matter, is passed to a second digesting or hydrating step where the phosphoric acid is diluted to substantially 75% phosphoric acid, so that the precipitated calcium sulfate and the precipitated iron and aluminum phosphates may more readily be separated therefrom by filtering. The temperature at which such dilution of the 100% phosphoric acid takes place is not material.

After the phosphoric acid has been reduced to substantially 75% concentration, the mixture of it and the precipitated calcium sulfate and iron and aluminum phosphates is subjected to filtration, and the 75% phosphoric acid is recovered in a substantially pure form. The filter cake will contain the calcium sulfate, the iron and aluminum phosphate and any other solid materials which may have been precipitated or formed during the process. The filtration may be carried out in any kind of filter, although a rotary filter is preferred. After the phosphoric acid of high purity has been separated from the precipitated material in the filter, the filter cake is washed with water to give phosphoric acid of relatively low concentration which may be used in the second digesting and hydrating step to dilute the 100% phosphoric acid resulting from the previous digesting operation.

For a specific example as to how the process of the present invention may be carried out, reference is made to the accompanying flow sheet, diagrammatically representing an operation carried out in the laboratory, with the amounts of materials used transposed to production size figures in order to show the commercial workability of the process.

7000 lbs. of pebble phosphate rock from the Florida pebble phosphate field containing 2170 lbs. of $P_2O_5$ and ground to a suitable fineness, and 3428 lbs. of 70% phosphoric acid containing 1719 lbs. of $P_2O_5$, produced in carrying out the process, were introduced into a ball mill 1 and mixed at a temperature of about 75° C. until the phosphoric acid was thoroughly distributed throughout the phosphate rock and a relatively dry, solidified mixture of the rock and acid was obtained. The relatively dry mixture was then passed into a calciner 2, where it was calcined or dehydrated at a temperature of about 200° C. During the heating of the mixture in the calciner 2 the reaction between the finely divided pebble phosphate and the phosphoric acid was completed and 1712 lbs. of water and most of the fluorine and other objectionable halogens were liberated and removed. The product remaining was a substantially dry polyphosphate containing CaO and $P_2O_5$ in a ratio greater than 1:1 but less than 2:1.

The substantially dry polyphosphate resulting from the calcination or dehydration of the mixture of finely divided pebble phosphate and phosphoric acid was divided into two portions. One portion comprising 7630 lbs. and containing 3410 lbs. of $P_2O_5$ was passed to digesters 3 and 3ª, arranged in series, where it was admixed with 6870 lbs. of 60° Bé. sulfuric acid and 128 cubic feet of 45° phosphoric acid from a subsequent filtering operation. In the digesters 3 and 3ª the sulfuric and phosphoric acids reacted with the polyphosphate to form a readily filterable form of calcium sulfate and pyrophosphoric and orthophosphoric acids. However, the pyrophosphoric acid hydrated with the excess water present and formed more orthophosphoric acid.

The mixture of orthophosphoric acid and calcium sulfate from the digester 3ª was passed to a rotary filter 4 where the crude orthophosphoric acid was separated from the precipitated calcium sulfate. The resulting filter cake was washed with water and the resulting 45° phosphoric acid returned to the digester 3 for use in digesting the polyphosphate. The filter cake from the filter 4 was passed into a repulper 5, where it was formed into a slurry which was passed to a second rotary filter 6. The strong wash water from the rotary filter 6 was returned to the rotary filter 4 while the weak wash water was returned and used for forming the slurry in the repulper 5. The calcium sulfate filter cake amounting to 8719 lbs. was passed to waste.

The crude phosphoric acid obtained as a filtrate from the rotary filter 4, and which was of 70% concentration, was divided into two portions with one portion containing 1719 pounds of $P_2O_5$ being returned for mixing with the pebble phosphate in the ball mill 1. The other portion of the 70% crude phosphoric acid, containing 1534 lbs. of $P_2O_5$, was passed to a mixer 7, where it was mixed with the other portion of the substantially dry polyphosphate from the calciner 2, which comprised 1008 lbs. and contained 449 lbs. of $P_2O_5$. The relative amounts of crude phosphoric acid and polyphosphate introduced into the mixer 7 were such as to give a resulting acid calcium metaphosphate of the formula $CaP_4O_{11}$. The crude phosphoric acid and polyphosphate were agitated violently in the mixer 7 at a temperature of approximately 120° C. so that an intimate mixing was obtained before the mixture set up. The mixture, after having set up, and weighing 4106 lbs. and containing 1998 lbs. of $P_2O_5$ was passed to a calciner 8 where it was gradually brought to a temperature of 350° C. Throughout the heating of the material in the calciner 8 up to the temperature of 350° C. care was taken that it was never heated faster than the liberated water could be driven off. During the calcining of the mixture in the calciner 8, 1483 lbs. of water were driven off and 2504 lbs. of an acid calcium metaphosphate of the formula $CaP_4O_{11}$ of 80% concentration and containing 1963 lbs. of P₂O₅ was obtained.

2454 lbs. of the 80% CaP₄O₁₁ obtained as set forth above, and containing 1924 lbs. of P₂O₅ was thoroughly mixed in a mixer 9 with 712 lbs. of 100% phosphoric acid containing 513 lbs. P₂O₅, obtained from a subsequent step of the process. The pasty mass thus formed, weighing 3166 lbs. and containing 2437 lbs. of P₂O₅, was then flowed into a digester 10 where it was digested at a temperature of about 150° C. The digestion was continued until the phosphoric acid had completely reacted with the acid calcium metaphosphate. The resulting material was then passed into the mixing tank 11 where it was digested with 916 lbs. of pure sulfuric acid of 60° Bé. and 1445 lbs. of 75% phosphoric acid containing 975 lbs. of P₂O₅. The mixture was digested at 65° C. in the mixing tank 11 until substantially all of the calcium present was precipitated as calcium sulfate. The mixture from the mixing tank 11 consisting of substantially 100% phosphoric acid, precipitated calcium sulfate and iron and aluminum phosphates which had been precipitated during the process, was passed to a second mixing tank 12 where the 100% phosphoric acid was reduced to 75% phosphoric acid by admixture with 6902 lbs. of 57% phosphoric acid containing 2899 lbs. of P₂O₅, obtained by washing the filter cake from a subsequent filtering operation. 1445 lbs. of the 75% phosphoric acid was returned to the mixing tank 11, where it was used in the digestion of the product from the digester 10. The remainder of the 75% phosphoric acid and the precipitated calcium sulfate and iron and aluminum phosphates were then passed to a rotary filter 13 and the 75% phosphoric acid containing 1914 lbs. of P₂O₅ separated and passed to a storage tank 14. The filter cake remaining in the filter was thoroughly washed with water to remove the phosphoric acid contained therein, and the resulting dilute acid returned to the mixing tank 12 to dilute the 100% phosphoric acid, as described above. The filter cake weighing 1162 lbs. and containing precipitated calcium sulfate, the precipitated iron and aluminum phosphates and any organic matter which was charred but not completely driven off in the calciner 2 was passed to waste.

While a specific example of forming phosphoric acid of high purity, starting from natural phosphate rock, has been described, it is to be understood that it is merely by way of exemplification, and that the invention is not limited thereby and that various changes may be made in the procedure within the scope of the appended claims without departing from the invention or sacrificing any of the advantages thereof. Also, it is to be understood that the invention is not limited to carrying the process through to the production of phosphoric acid of high purity, as it provides an excellent and economical procedure for the production of intermediate products, such as crude phosphoric acid and acid metaphosphate.

What is claimed is:

1. The method of producing phosphoric acid which comprises mixing a calcium phosphate with a phosphoric acid in such relative amounts that the resulting mixture has a CaO to P₂O₅ ratio greater than 1:1 but less than 2:1, calcining the resulting mixture at an elevated temperature below 240° C. to provide a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

2. The method of producing phosphoric acid which comprises mixing a calcium phosphate with a phosphoric acid in such relative amounts that the resulting mixture has a CaO to P₂O₅ ratio greater than 1:1 but less than 2:1, calcining the resulting mixture at an elevated temperature not exceeding about 200° C. to provide a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

3. The method of producing phosphoric acid which comprises mixing a calcium phosphate with a phosphoric acid in such relative amounts that the resulting mixture has a CaO to P₂O₅ ratio between 5:3 and 5:4, calcining the resulting mixture at an elevated temperature below 240° C. to produce a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

4. The method of producing phosphoric acid which comprises mixing a calcium phosphate with a phosphoric acid in such relative amounts that the resulting mixture has a CaO to P₂O₅ ratio of 5:3, calcining the resulting mixture at an elevated temperature below 240° C. to produce a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

5. The method of producing phosphoric acid which comprises mixing a calcium phosphate with a phosphoric acid in such relative amounts that the resulting mixture has a CaO to P₂O₅ ratio of 5:4, calcining the resulting mixture at an elevated temperature below 240° C. to produce a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

6. The method of producing phosphoric acid which comprises mixing a calcium phosphate with phosphoric acid in such relative amounts that the resulting mixture has a CaO to $P_2O_5$ ratio greater than 1:1 but less than 2:1, calcining the resulting mixture at an elevated temperature below 240° C. to provide a relatively dry product, reacting the product of the calcination with phosphoric acid to form calcium phosphate in solution in phosphoric acid, reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles, separating the phosphoric acid, and returning a portion of the separated phosphoric acid for mixing with further amounts of a calcium phosphate to form the mixture having said CaO to $P_2O_5$ ratio.

7. The method of producing phosphoric acid which comprises mixing phosphate rock with a phosphoric acid at a temperature between about 50° C. and 100° C., the amount of phosphoric acid being such that the resulting mixture has a CaO to $P_2O_5$ ratio greater than 1:1 but less than 2:1, calcining the resulting mixture at an elevated temperature below 240° C. to provide a relatively dry product, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

8. The method of producing phosphoric acid which comprises mixing phosphate rock with a phosphoric acid in such relative amounts that the resulting mixture has a CaO to $P_2O_5$ ratio greater than 1:1 but less than 2:1, calcining the resulting mixture at an elevated temperature below 240° C. until at least 75% of the moisture present and most of the halogens present as impurities in the phosphate rock are removed, reacting the product of the calcination with phosphoric acid to form calcium phosphate in solution in phosphoric acid, and reacting the calcium phosphate in solution in phosphoric acid with sulfuric acid to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

9. The method of producing phosphoric acid which comprises mixing a calcium phosphate with a phosphoric acid in such relative amounts that the resulting mixture has a CaO to $P_2O_5$ ratio greater than 1:1 but less than 2:1, calcining the resulting mixture at an elevated temperature below about 240° C. to provide a relatively dry product, reacting the product of the calcination with phosphoric acid of about 60% concentration to form calcium phosphate in solution in phosphoric acid, and reacting the calcium phosphate in solution in phosphoric acid with sulfuric acid of about 70% concentration to form phosphoric acid and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles.

10. The method of producing an acid metaphosphate which comprises mixing a calcium phosphate with a phosphoric acid in such relative amounts that the resulting mixture has a CaO to $P_2O_5$ ratio greater than 1:1 but less than 2:1, calcining the resulting mixture at an elevated temperature below 240° C. to provide a relatively dry product, reacting a portion of the product of the calcination with phosphoric acid to form calcium phosphate in solution in phosphoric acid, reacting the calcium phosphate in solution in phosphoric acid with sulfuric acid to form crude phosphoric acid of high concentration and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles, separating the resulting crude concentrated phosphoric acid, mixing at least a portion of the separated crude concentrated phosphoric acid with another portion of said relatively dry product, the amount of crude concentrated phosphoric acid mixed with said other portion of the relatively dry product being such that the resulting mixture has a CaO to $P_2O_5$ ratio less than 1:1 but not less than 1:2, and calcining the resulting mixture to remove water and to produce an acid calcium metaphosphate containing CaO and $P_2O_5$ in a ratio less than 1:1.

11. The method of producing an acid metaphosphate which comprises mixing a calcium phosphate with a phosphoric acid in such relative amounts that the resulting mixture has a CaO to $P_2O_5$ ratio greater than 1:1 but less than 2:1, calcining the resulting mixture at an elevated temperature below 240° C. to provide a relatively dry product, reacting a portion of the product of the calcination with phosphoric acid to form calcium phosphate in solution in phosphoric acid, reacting the calcium phosphate in solution in phosphoric acid with sulfuric acid to form crude phosphoric acid of high concentration and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles, separating the resulting crude concentrated phosphoric acid, mixing at least a portion of the separated crude concentrated phosphoric acid with another portion of said relatively dry product, the amount of crude concentrated phosphoric acid mixed with said other portion of the relatively dry product being such that the resulting mixture has a CaO to $P_2O_5$ ratio less than 1:1 but not less than 1:2, and calcining the resulting mixture at a temperature above 315° C. but not substantially above 400° C. to provide a relatively dry acid calcium metaphosphate containing CaO and $P_2O_5$ in a ratio less than 1:1.

12. The method of producing an acid metaphosphate which comprises mixing a calcium phosphate with a phosphoric acid in such relative amounts that the resulting mixture has a CaO to $P_2O_5$ ratio greater than 1:1 but less than 2:1, calcining the resulting mixture at an elevated temperature below 240° C. to provide a relatively dry product, reacting a portion of the product of the calcination with phosphoric acid to form calcium phosphate in solution in phosphoric acid, reacting the calcium phosphate in solution in phosphoric acid with sulfuric acid to form crude phosphoric acid of high concentration and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles, separating the resulting crude concentrated phosphoric acid, mixing at least a portion of the separated crude concentrated phosphoric acid with another portion of said relatively dry product, the amount of crude concentrated phosphoric acid mixed with said other portion of the relatively dry product being such that the resulting mixture has a CaO to $P_2O_5$ ratio less than 1:1 but not less than 1:2, and calcining the resulting mixture at a temperature between about 350° C. and 400° C. to provide a relatively dry product containing CaO and $P_2O_5$ in a ratio less than 1:1.

13. The method of producing a phosphoric acid of high purity which comprises mixing a calcium phosphate containing iron and aluminum compounds as impurities with a phosphoric acid in such relative amounts that the resulting mixture has a CaO to $P_2O_5$ ratio greater than 1:1, but less than 2:1, calcining the resulting mixture at an elevated temperature below 240° C. to provide a relatively dry product, reacting a portion of the product of the calcination with phosphoric acid to form calcium phosphate in solution in phosphoric acid, reacting the calcium phosphate in solution in phosphoric acid with sulfuric acid to form crude phosphoric acid of high concentration and to precipitate from the solution calcium present as calcium sulfate, whereby the sulfuric acid does not react with the product of the calcination in solid form with resultant formation of a coating of insoluble precipitate of calcium sulfate on the particles thereof, which would impede further reaction of the sulfuric acid with the particles, separating the concentrated crude phosphoric acid, mixing at least a portion of the separated crude concentrated phosphoric acid with another portion of said relatively dry product, the amount of crude concentrated phosphoric acid mixed with said other portion of the dry product being such that the resulting mixture has a CaO to $P_2O_5$ ratio less than 1:1 but not less than 1:2, calcining the resulting mixture at a temperature between about 350° C. and 400° C. to remove water and to produce relatively dry acid calcium metaphosphate, reacting the product of such high temperature calcination with phosphoric acid to form a calcium phosphate in solution in phosphoric acid, reacting the calcium phosphate in solution in phosphoric acid with sulfuric acid to form substantially 100% phosphoric acid and to precipitate from the solution calcium present as calcium sulfate, whereby the sulfuric acid does not react with the relatively dry acid calcium metaphosphate in solid form with resultant formation of a coating of insoluble precipitate of calcium sulfate on the particles thereof, which which impede further reaction of the sulfuric acid with the particles, diluting the substantially 100% phosphoric acid, and, thereafter, filtering off the calcium sulfate and aluminum and iron metaphosphates formed during the calcining operations to obtain phosphoric acid of high purity.

JOHN HARRY COLEMAN.